US008966345B2

(12) United States Patent
Wilkerson et al.

(10) Patent No.: US 8,966,345 B2
(45) Date of Patent: Feb. 24, 2015

(54) SELECTIVE ERROR CORRECTION IN MEMORY TO REDUCE POWER CONSUMPTION

(71) Applicant: Intel Corporation, Santa Clara, CA (US)

(72) Inventors: Christopher B. Wilkerson, Portland, OR (US); Alaa R. Alameldeen, Beaverton, OR (US); Shih-Lien L. Lu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 13/688,028

(22) Filed: Nov. 28, 2012

(65) Prior Publication Data
US 2014/0149822 A1  May 29, 2014

(51) Int. Cl.
*H03M 13/00* (2006.01)
*G06F 11/08* (2006.01)

(52) U.S. Cl.
CPC ................................ *G06F 11/08* (2013.01)
USPC ........................... 714/774; 714/769; 714/805

(58) Field of Classification Search
CPC ............................. H04L 1/009; H04L 1/0057
USPC ......... 714/774, 769, 758, 764, 748, 805, 762, 714/752
See application file for complete search history.

(56) References Cited

U.S. PATENT DOCUMENTS

| 6,760,878 | B2 * | 7/2004  | Yashima ................... 714/755 |
| 7,424,648 | B2 * | 9/2008  | Honda ...................... 714/52  |
| 7,636,833 | B2 * | 12/2009 | Tremaine .................. 711/207 |
| 7,702,987 | B2 * | 4/2010  | Kim .......................... 714/769 |
| 8,161,356 | B2   | 4/2012  | Bains et al.                        |
| 8,677,217 | B2 * | 3/2014  | Takeuchi et al. ........... 714/764 |

* cited by examiner

*Primary Examiner* — Fritz Alphonse
(74) *Attorney, Agent, or Firm* — Schwabe, Williamson & Wyatt, P.C

(57) ABSTRACT

Embodiments of apparatus, methods, systems, and devices are described herein for selective error correction in memory with multiple operation modes. In various embodiments, an error correction block (e.g., of a memory controller) may be configured to perform error correction on data read from a first portion of a memory based on a corresponding error correction code read from a second portion of the memory, and to calculate and store the error correction code. A control block coupled to the error correction block may be configured to selectively enable/disable the error correction block to perform the error correction, and to calculate and store the error correction code, based at least in part on a current operation mode of the memory.

23 Claims, 5 Drawing Sheets

SELECTIVE ERROR CORRECTION IN MEMORY TO REDUCE POWER CONSUMPTION

FIELD

Embodiments of the present invention relate generally to the technical field of data processing, and more particularly, to selective error correction in memory to reduce power consumption.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Memory such as volatile memory (e.g., dynamic random access memory, or "DRAM") may be refreshed at a refresh rate sufficient to maintain its rows and columns of stored data. If the memory is not refreshed or refreshed at a lower rate, errors may accumulate and/or data may be lost.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "block," "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
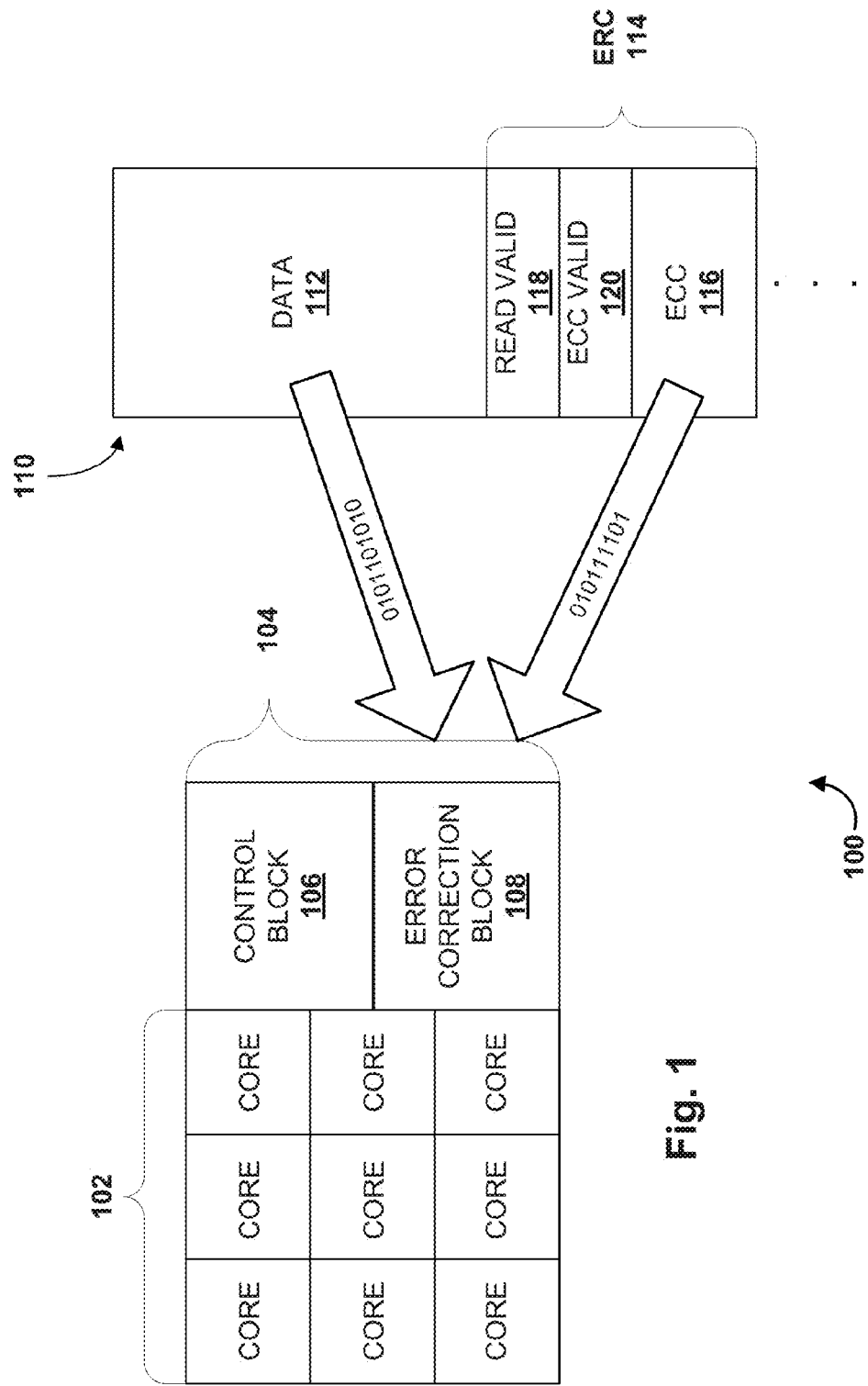
FIG. 1 schematically illustrates an example system configured with applicable portions of the present disclosure, in accordance with various embodiments.

With reference to FIG. 1, in various embodiments, a system 100 may include one or more processing units (e.g., cores) 102 and a memory controller 104, coupled with each other. In various embodiments, memory controller 104 may include a control block 106 and an error correction block 108. Control block 106 and/or error correction block 108 may be implemented with any combination of hardware and software. The configuration shown in FIG. 1 is just one non-limiting example. In other embodiments, control block 106 and/or error correction block 108 may be separate from memory controller 104 and/or each other.

In various embodiments, system 100 may also include memory 110. Memory 110 may be coupled with, and employed to store data accessible by, one or more processing units 102. Memory 110 may be any memory that may lose charge over time, thus incurring errors. For instance, memory 110 may be volatile memory, including but not limited to dynamic random access memory ("DRAM"). In other embodiments, memory 110 may be so-called non-volatile memory that, despite its name, may lose data if not refreshed over an extended period of time (e.g., months or years). Examples of non-volatile memory may include non-volatile memory commonly found in solid state drives (e.g., phase change memory, NAND or flash memory, etc.).

In various embodiments, memory 110 may be configured to be transitioned between multiple operation modes with varying susceptibilities to error. The term "operation mode" as used herein may refer to a state in which memory 110 has a particular susceptibility to error. For example, assuming memory 110 is DRAM, in a first operation mode, each row (not shown) of memory 110 may be refreshed every 64 milliseconds ("ms") or less. The first operation mode in this example may include one or more of a "self refresh mode," in which data is not necessarily being written or read from memory, but system 100 able to read and write on command, and an "active" mode in which system 100 is actively reading from and/or writing to memory 110. Due to a relatively high refresh rate, memory 110 may have a relatively low susceptibility to error in the first operation mode.

In a second operation mode, each row of memory 110 may be refreshed at a lower refresh rate, such as less than every 64 ms to every 2048 ms and beyond. The lower refresh rate may result in a second susceptibility for error that is higher than that of memory 110 in the first operation mode. In various embodiments, the second operation mode may be considered an "idle" or "low power" mode, as the lower refresh rate may result in memory 110 consuming less power than it consumes in the first operation mode.

Although two operation modes with two susceptibilities to error are described as examples herein, this is not meant to be limiting, and memory 110 may be transitioned between any number of operation modes having varying susceptibilities to error. Memory 110 may also consume various amounts of power when in the various operation modes. Moreover, while many examples described herein refer to volatile memory, disclosed techniques may be used on other forms of memory that are transitionable between multiple operation modes having varying susceptibilities to error. For example, NAND memory that may be found in, for example, solid state drives, could be transitionable between multiple operation modes having varying susceptibilities to errors, and such errors could be corrected using techniques disclosed herein.

Memory 110 may be transitioned between operation modes for various reasons. For example, transition of memory 110 from the first operation mode (e.g., self refresh) to the second operation mode (e.g., low power) may be triggered when the one or more processing units 102 have been inactive for more than a predetermined amount of time, when no user input received for more than a predetermined amount of time, when a command is received, e.g., by closing a laptop computer or locking a smart phone, and so forth. Likewise, transition of memory 110 from the second operation mode back to the first operation mode may be triggered for various reasons, such as user input, receipt of an incoming communication such as a telephone call, notification, message, client-server request, and so forth.

While operating in a mode with a relatively high susceptibility to error, such as the second operation mode described above, errors may accumulate in data stored in memory 110. For example, with a lower refresh rate, charge in cells may be lost, resulting in errors. Additionally or alternatively, when system 100 comes into contact with electrical and/or magnetic interference, errors may be incurred. To enable correction of those errors, in various embodiments, memory 110 may be logically divided, e.g., by memory controller 104, into a data portion 112 for storage of data, and an "error repair and control" ("ERC") portion 114 for storage of an error correction code ("ECC" in FIG. 1) 116. In various embodiments, memory 110 may be logically divided into multiple data portions 112 for storage of data, with multiple corresponding ERC portions 114 for storage of error correction codes 116, as indicated by the ellipses in FIG. 1.

Data portion 112 may come in various sizes. In some embodiments, where memory 110 has a size of 4 GB, each data portion 112 may be 256 bytes. In some such embodiments, error correction code 116 may be 37 bits, e.g., to correct three bit errors per 256 bytes, and ERC portion 114 may further include two validity bits (described below).

Error correction code 116 in ERC portion 114 may come in various forms, e.g., relating to coding and/or redundancy schemes used for correction and/or checking for memory errors. In some embodiments, error correction code 116 may include parity bits calculated from data stored in data portion 112. In other embodiments, error correction code 116 may include other types of error correction and/or detection data, such as cyclic redundancy check ("CRC") bits, column/row redundancy data, and so forth.

Error correction block 108 may be configured to perform error correction on data read from data portion 112 of memory 110 based on a corresponding error correction code 116 read from ERC portion 114 of memory 110. However, one or more processing units 102 may generate hundreds of millions of memory reads per second. When transitioning from an operation mode with a higher susceptibility to error (e.g., low power mode) to another operation mode with a lower susceptibility to error (e.g., self refresh mode), performing error correction on every data portion 112 of memory 110 may be resource and/or time intensive. For example, each memory reference may be coupled with an additional read from ERC portion 114 to retrieve error correction code 116. Additionally, performance of error correction using error correction code 116 may require that the entire corresponding data portion 112 be checked, even if data from only a subset of data portion 112 is being accessed.

Accordingly, in various embodiments, control block 106 may be configured to selectively enable error correction block 108 to perform error correction on data read from memory 110 or disable error correction block 108 from performance of error correction on data read from memory 110. In various embodiments, this selective enabling/disabling may be based at least in part on a current operation mode of memory 110.

Assume memory 110 has just been transitioned from the second operation mode (e.g., low power), during which it accumulated errors, to the first operation mode (e.g., active/self refresh). Performing error correction on all data of memory 110 to correct those accumulated errors might incur unacceptable overhead, particularly where much of the data stored in memory 110 is not ultimately accessed. Instead, memory controller 104 may perform "just in time" error correction on data as it is read. For example, control block 106 may be configured to determine whether, since a most recent transition of memory 110 to the first operation mode from the second operation mode, error correction has been performed on the data read from data portion 112 of memory 110.

On determination that, since the most recent transition to the first operation mode (e.g., active/self refresh), error correction has not been performed on data read from data portion 112, control block 106 may be configured to enable error correction block 108 to perform error correction on the data read from data portion 112. However, on determination that, since the most recent transition to the first operation mode, error correction has been performed on data read from data portion 112, control block 106 may be configured to disable error correction block 108 from performance of error correction on the data read from data portion 112. In some embodiments, on such a determination, control block 106 may be configured to disable error correction block 108 from performing error correction on data read from data portion 112 until memory 110 transitions from the first operation mode to the second operation mode, and back again. This may ensure that error correction is not performed on the same data multiple times while in the first operation mode, as well as ensure that error correction is only performed on data that is actually used.

Control block 106 may be configured to determine whether error correction has been performed on data read from data portion 112 in various ways. In various embodiments, ERC portion 114 may be configured to store an indication of whether, since the most recent transition, error correction has been performed on data read from data portion 112. For example, in FIG. 1, ERC portion 114 may include a "read valid" bit 118. After performance of error correction on data read from data portion 112, control block 106 may be configured to write or cause to write, e.g., to read valid bit 118, the indication that, since the most recent transition, error correction has been performed on data read from data portion 112. Thereafter, before enabling error correction block 108 to perform error correction on a particular data portion 112, control block 106 may first check read valid bit 118. Depending on the value of read value bit (e.g., 0 or 1), control block 106 may enable or disable error correction block 108 from performance of error correction on data read from data portion 112.

At various times, a read valid bit 118 of each ERC portion 114 may be set or reset (e.g., "cleared") to indicate that error correction has not yet been performed on data ready from the corresponding data portion 112. In some embodiments, the read valid bits may be set or reset on transition of memory 110 from an operation mode with a lower susceptibility to error (e.g., the first operation mode described above, active/self refresh) to another operation mode with a higher susceptibility to error (e.g., the second operation mode described above, low power mode). That way, when memory 110 is transitioned back to the operation mode with lower susceptibility for error, data portions 112 may be error checked the first time they are read. Upon a first read of a data portion 112, the corresponding read valid bit may be marked or otherwise altered. That way, further error correction on that particular data portion 112 may be avoided, at least until transition back to the operation mode with higher susceptibility to error.

When data is written to a data portion 112, the error correction code 116 stored in the corresponding ERC portion 114 may no longer be valid. Accordingly, error correction block 108 may be configured to calculate (or recalculate) and store, in ERC portion 114 of memory 110, the error correction code 116 that corresponds to the data written to data portion 112 of memory 110. However, when memory 110 operates in a mode with relatively low susceptibility to error, such as the first operation mode (e.g., active/self refresh) described above, recalculation and storage of updated error correction codes 116 may consume excessive resources and/or time. Given the low probability of error while operating in this mode and the potentially large number of memory writes, it may not be worthwhile to recalculate and store new error correction codes for each write.

Accordingly, in various embodiments, control block 106 may be configured to selectively enable error correction block 108 to calculate and store error correction code 116, or disable error correction block 108 from calculation and storage of error correction code 116, based at least in part on the current operation mode of memory 110. In this manner, data in data portion 112 may be permitted to diverge from error correction code 116 while memory 110 is in an operation mode that has a relatively low susceptibility to error, such as an active mode.

For instance, on transition of memory 110 from the first operation mode (e.g., active/self refresh) to the second operation mode (e.g., low power), control block 106 may be configured to determine whether error correction code 116 stored in ERC portion 114 is valid for data read from data portion 112. If control block 106 determines that error correction code 116 is invalid, control block 106 may be configured to enable error correction block 108 to perform the calculation and storage. However, if control block 106 determines that error correction code 116 is valid, control block 106 may be configured to disable error correction block 108 from recalculation and storage of error correction code 116. This avoids recalculation and storage of error correction codes 116 for every data portion 112 of memory 110 upon transition from the first operation mode to the second operation mode.

Additionally, after transition of memory 110 from the second operation mode (e.g., low power) to the first operation mode (e.g., active/self refresh), control block 106 may be configured to disable error correction block 108 from (re)calculation and storage of error correction code 116 until transition of memory 110 from the first operation mode back to the second operation mode. This may avoid recalculation and storage of error correction codes every time data is written to memory 110 while in the first operation mode, which may be wasteful.

Control block 106 may be configured to track whether error correction code 116 stored in ERC portion 114 is valid for data currently stored in data portion 112 in various ways. For example, after a first write to data portion 112 following transition of memory 110 from the second operation mode to the first operation mode, control block 106 may be configured to designate error correction code 116 in the corresponding ERC portion 114 as invalid. For instance, control block 106 may store such an indication in an error correction code ("ECC") valid bit 120 of ERC portion 114. At the next transition from the first operation mode (e.g., active/self refresh) to the second operation mode (e.g., low power), control block 106 may enable error correction block 108 to recalculate and store error correction codes only for those ERC portions having ECC valid bits indicating that a corresponding error correction code 116 is invalid.

Figure 2:
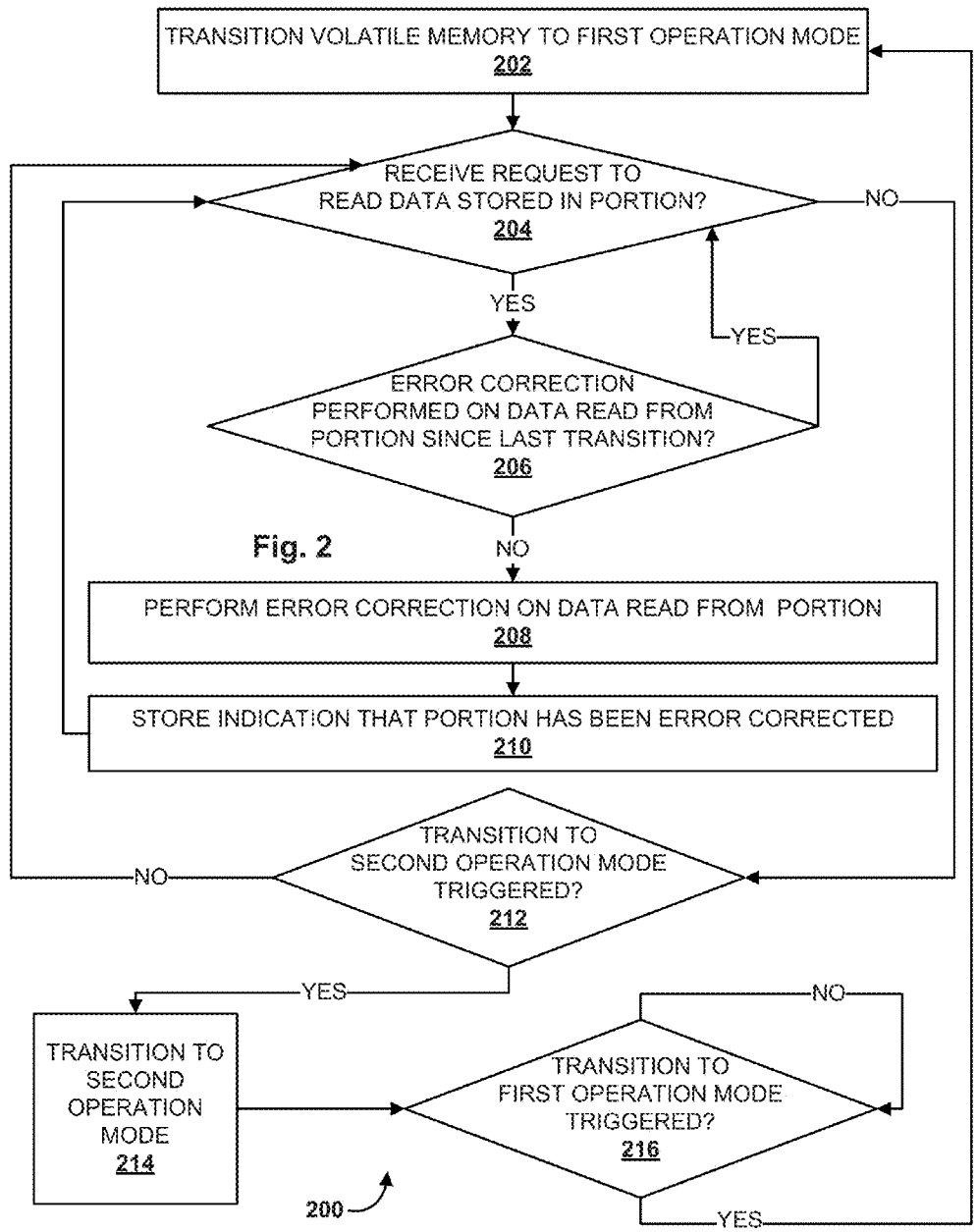
FIG. 2 depicts an example method that may be implemented on a system configured with applicable portions of the present disclosure, in accordance with various embodiments.

An example method 200 that may be implemented by, e.g., memory controller 104 equipped with control block 106 and error correction block 108, is depicted in FIG. 2. In this example, method 200 may start at block 202, in which memory 110 may be transitioned, e.g., by control block 106, to the first operation mode (e.g., active/self refresh), e.g., from the second operation mode (e.g., low power). However, that starting point is arbitrary, and not meant to be limiting. A system configured with applicable portions of the present disclosure may begin at any of the blocks of FIG. 2, depending on its current operation mode. Additionally, while shown in a particular order, that is not meant to be limiting, and various operations of FIG. 2 may be omitted or performed in a different order. Further, two operation modes are depicted in FIG. 2, but that is not meant to be limiting. Memory 110 may be transitioned between any number of operation modes.

At block 204, if a request to read data from a particular data portion 112 of memory 110 is received, then at block 206, it may be determined, e.g., by control block 106, whether error correction has been performed on data read from the particular data portion 112 since the transition at block 202. If the answer is yes, then error correction need not be performed again, and method 200 may proceed back to block 204 to await another read request.

However, if at block 206, the answer is no, then at block 208, error correction may be performed on data read from the particular data portion 112. For example, control block 106 may enable error correction block 108 to perform error correction on data read from the particular data portion 112 based on an error correction code 116 in a corresponding ERC portion 114. At block 210, an indication that the particular data portion 112 has been error corrected since the last transition at block 202 may be stored, e.g., in read valid bit 118.

Back at block 204, while in the first operation mode waiting for a read request, memory controller 104 may also wait for transition of memory 110 to the second operation mode (e.g., low power) to be triggered at block 212. For instance, if system 100 is a laptop computer, a user could trigger a transition of memory 110 from an active mode to a low power mode by closing the laptop. As another example, if system 100 is a smart phone, then a transition of memory 110 to a low power mode may be triggered by a predetermined period of inactivity, an explicit command from the user, a battery level dropping below a particular threshold, and so forth.

In any case, once the transition is triggered, at block 214, memory 110 may be transitioned, e.g., by control block 106, to the second operation mode (e.g., low power). Memory 110 may remain in the second operation mode until a transition to the first operation mode is triggered at block 216. For example, a user could open up a laptop computer, unlock a smart phone, or system 100 may receive an incoming communication (e.g., phone call, client-server request, notification, message, etc.). Method 200 may then proceed to block 202.

Figure 3:
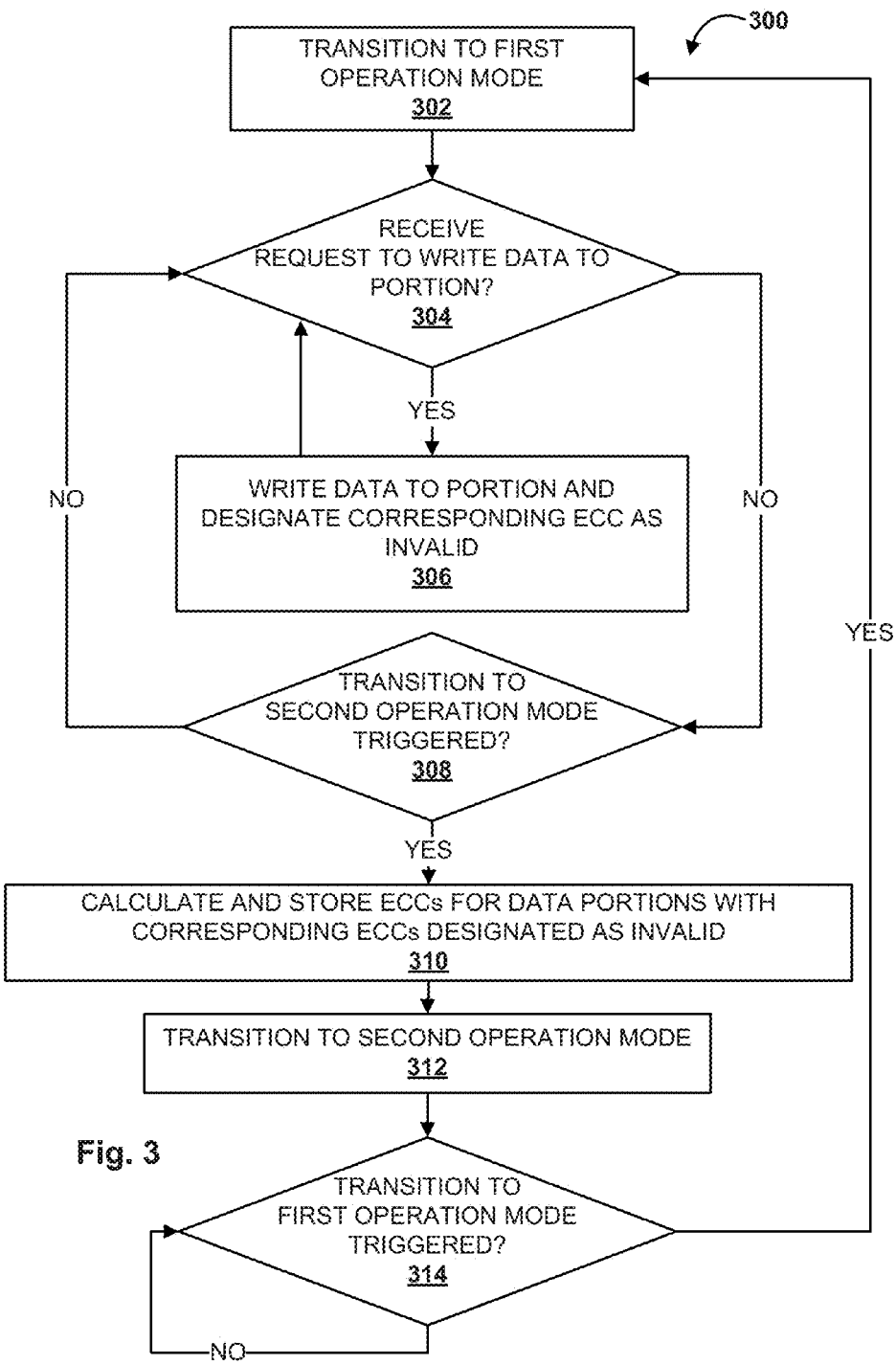
FIG. 3 depicts another example method that may be implemented on a system configured with applicable portions of the present disclosure, in accordance with various embodiments.

Another example method 300 that may be implemented by, e.g., memory controller 104 equipped with control block 106 and error correction block 108, is depicted in FIG. 3. Method 300 may start at block 302, in which memory 110 is transitioned, e.g., by control block 106, from the first operation mode (e.g., active/self refresh) to the second operation mode (e.g., low power). However, that starting point is arbitrary, and not meant to be limiting. A system configured with applicable portions of the present disclosure may begin at any of the blocks of FIG. 3, depending on its current operation mode. Moreover, while shown in a particular order, that is not meant to be limiting, and various operations of FIG. 3 may be omitted or performed in a different order.

At block 304, if a request to write data to a particular data portion 112 of memory 110 is received, then at block 306, the data may be written to the data portion 112, and a corresponding error correction code 116 may be designated as invalid. For example, ECC valid bit 120 may be set (e.g., equal to 0 or 1, depending on the implementation) to indicate that error correction code 116 is invalid. Method 300 may then proceed back to block 304 to await another write request or a trigger to the second operation mode.

If, at block 308, a transition from the first operation mode to the second operation mode is triggered (as described above with regard to block 212), then method 300 may proceed to block 310. At block 310, error correction codes 116 designated as invalid may be recalculated and stored, e.g., in ERC portion 114. For instance, for any data portion 112 with a corresponding ECC valid bit 120 indicating that the corresponding error correction code 116 is invalid, a new error correction code 116 may be calculated and stored. As described above, this may avoid recalculation and storage of error correction code 116 for every data portion 112, which may be resource and/or time intensive.

At block 312, memory 110 may be transitioned, e.g., by control block 106, from the first operation mode to the second operation mode. At that point, memory 110 may remain in the second operation mode (e.g., low power) until a transition to the first operation mode (e.g., active/self refresh) is triggered at block 314, as described above with regard to block 216. Method 300 then may proceed back to block 302.

Figure 4:
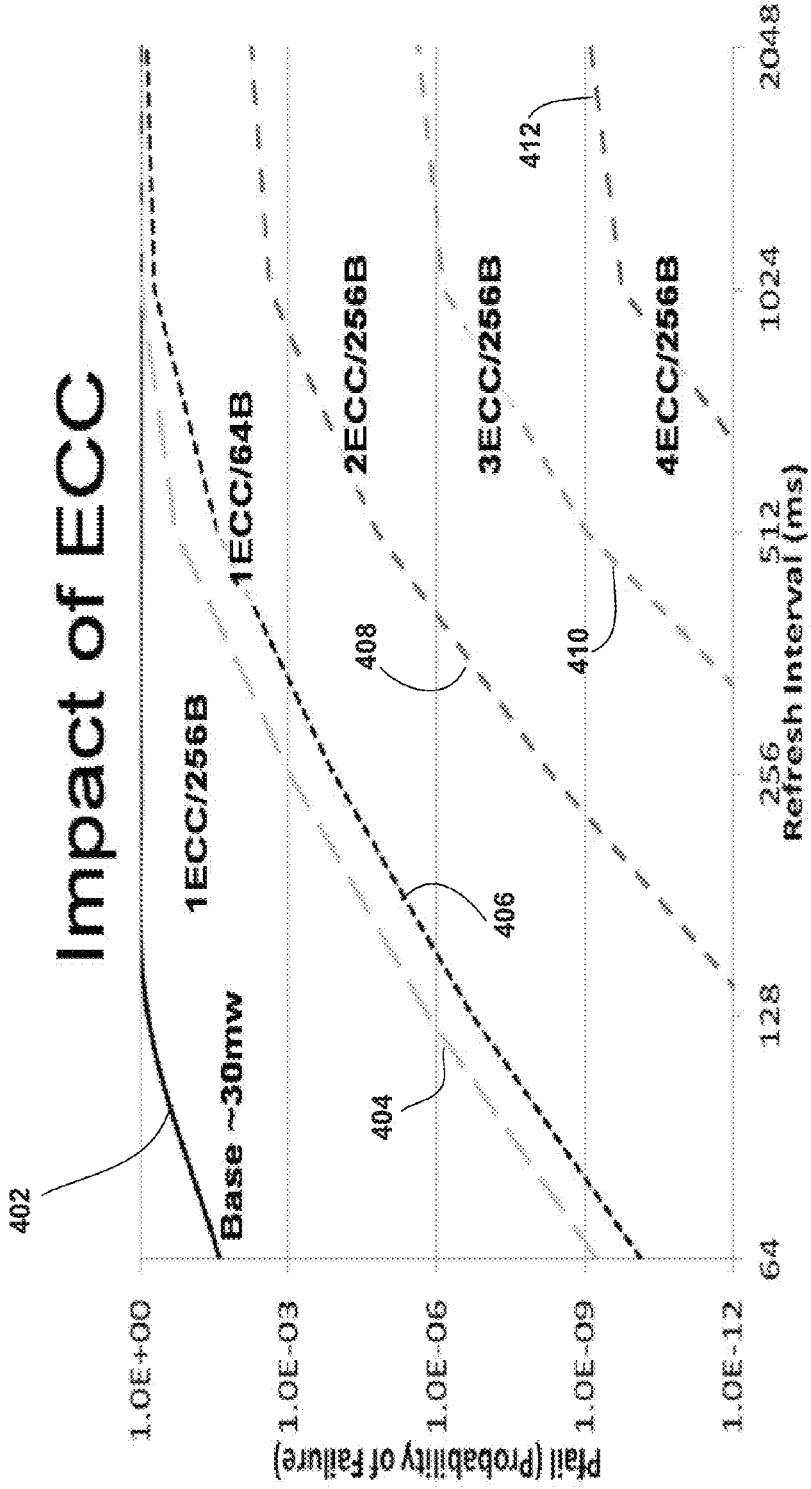
FIG. 4 schematically illustrates example results of selective error correction, in accordance with various embodiments.

FIG. 4 depicts example results that may be obtained by including various numbers of error correction codes for data portions of varying sizes in a memory 110 of 4 GB. The X-axis represents a refresh interval (in ms) of memory 110 in ms. The greater the interval, the lower the refresh rate. The Y-axis represents a resulting probability of a single bit error. It can be seen that, in general, as the refresh interval increases (and the refresh rate decreases), the probabilities of error increase.

For instance, a first curve 402 represents a base probability of failure when no error correction codes are used. At a refresh interval of 64 ms, which may be typical when a system or device is in an active or self refresh mode, memory 110 may have a probability of error of approximately $1.0 \times 1^{-1.5}$. The probability of error quickly increases to approximately 1.0 once the refresh interval exceeds 128 ms.

A second curve 404 represents a probability of failure when one error correction code 116 is used per 256-bytes of memory 110. For instance, this may represent the use of a single bit, single-error-correcting, double-error-detecting ("SECDED") code. At a refresh interval of 64 ms, the probability of error is just below $1.0 \times 10^{-9}$. However, the probability of error does not increase to near 1.0 until a refresh interval of almost 1024 ms is employed.

A third curve 406 represents a probability of failure when one error correction code 116 is used per 64-bytes of memory 110. At a refresh interval of 64 ms, the probability of error is approximately $1.0 \times 10^{-10}$. However, the probability of error does not increase to near 1.0 until a refresh interval of approximately 1024 ms is employed.

A fourth curve 408 represents a probability of failure when two error correction codes 116 are used per 256-bytes of memory 110. For instance, this may represent the use of a double bit, for double error correction-triple error detection ("DEC-TED") code. At a refresh interval of 64 ms, the probability of error is well below $1.0 \times 10^{-12}$. The probability of error doesn't even rise to $1.0 \times 10^{-12}$ until a refresh rate of over 128 ms is employed. Even at a refresh interval of 2048 ms, the probability of error only increases to approximately $1.0 \times 10^{-6}$.

A fifth curve 410 represents a probability of failure when three error correction codes 116 are used per 256-bytes of memory 110. The probability of error doesn't even rise to $1.0 \times 10^{-12}$ until a refresh rate of over 256 ms is employed. Even at a refresh interval of 2048, the probability of error only increases to just over $1.0 \times 10^{-6}$.

A sixth curve 412 represents a probability of failure when four error correction codes 116 are used per 256-bytes of memory 110. The probability of error doesn't even rise to $1.0 \times 10^{-12}$ until a refresh rate of well over 512 ms is employed. Even at a refresh interval of 2048, the probability of error only increases to just less than $1.0 \times 10^{-9}$.

In various embodiments, extra overhead incurred by the selective error correction may be limited in various ways. In some embodiments, additional memory requests for checking/updating read valid bits 118 and ECC valid bits 120 may be limited by maintaining a buffer (e.g., 64 KB) on one or more processing units 102 to cache valid bits. In some cases, this may result in the additional overhead caused by the selective error correction described herein adding less than 1% extra processing.

Figure 5:
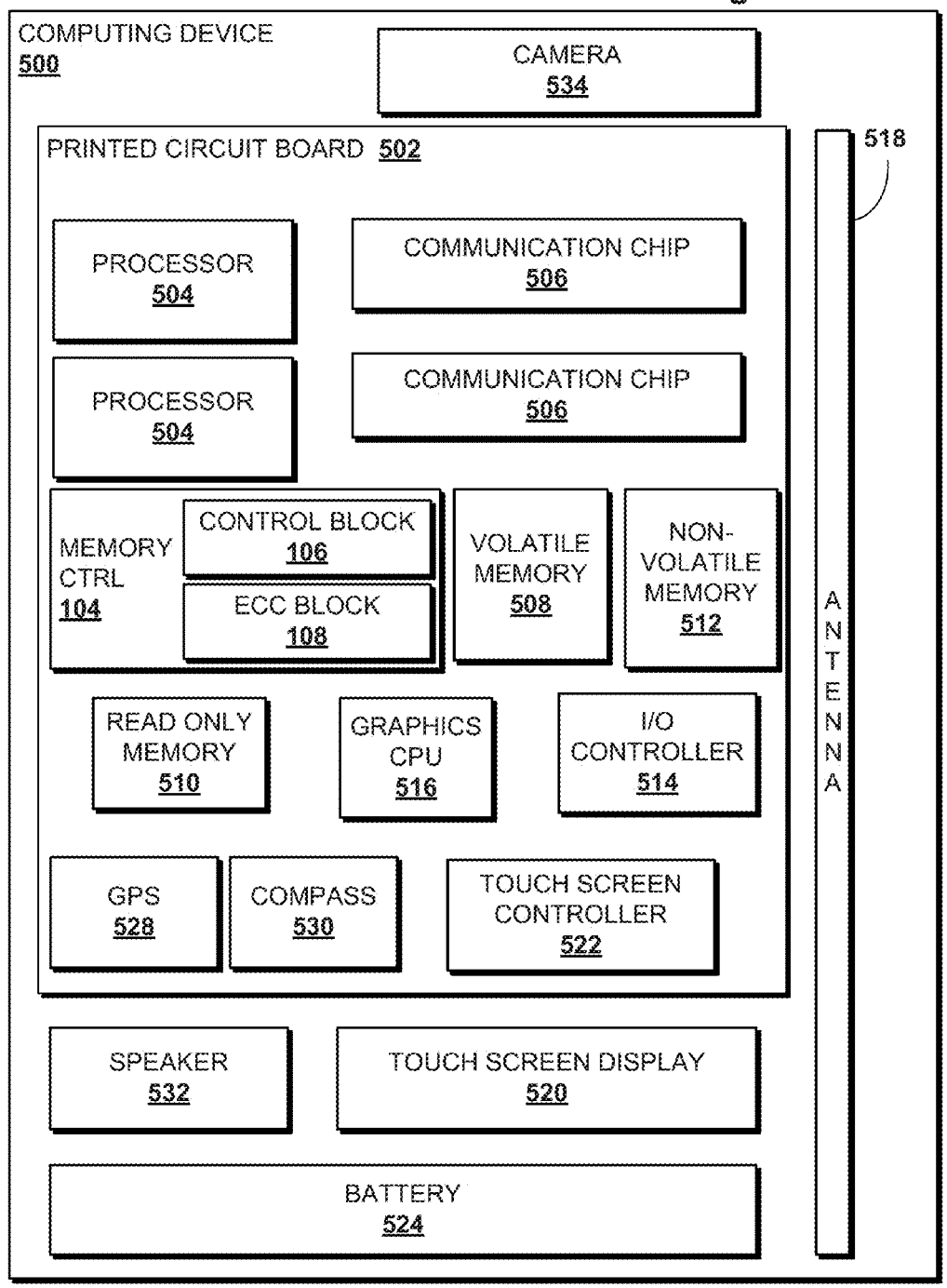
FIG. 5 schematically depicts an example computing device that may be configured with applicable portions of the present disclosure, in accordance with various embodiments.

FIG. 5 illustrates an example computing device 500 in which systems such as system 100 may be incorporated, in accordance with various embodiments. Computing device 500 may include a number of components, one or more processor(s) 504 and at least one communication chip 506. In various embodiments, the one or more processor(s) 504 each may include one or more processor cores. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board ("PCB") 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, volatile memory 508 (e.g., dynamic random access memory, also referred to as "DRAM"), memory controller 104 (which may include control block 106 and/or error correction block 108), read-only memory ("ROM") 510, non-volatile memory 512, an input/output ("I/O") controller 514, a digital signal processor (not shown), a crypto processor (not shown), a graphics processor 516, one or more antenna 518, a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, and a mass storage device (such as hard disk drive, a solid state drive, compact disk ("CD"), digital versatile disk ("DVD")) (not shown), and so forth. In various embodiments, non-volatile memory 512 may come in various forms, including but not limited to NAND (flash) memory, ferroelectric random-access memory ("FeTRAM"), nanowire-based non-volatile memory, three-dimensional ("3D") cross point memory such as phase change memory ("PCM") or PCM with switch ("PCMS"), memory that incorporates memristor technology, magnetoresistive random-access memory ("MRAM"), spin transfer torque MRAM ("STT-MRAM"), and so forth. In various embodiments, the processor 504 may be integrated on the same die with other components, such as memory controller 104, control block 106 and/or error correction block 108, to form a System on Chip ("SoC").

In various embodiments, memory controller 104 may be operated by and/or coupled with volatile memory (e.g., DRAM 508) and/or the one or more processor(s) 504. In some embodiments, the one or more processor(s) 504 and/or volatile memory (e.g., DRAM 508) may include associated firmware (not shown) storing programming instructions configured to enable computing device 500, in response to execution of the programming instructions by one or more processor(s) 504, to implement memory controller 104, control block 106 and/or error correction block 108, any of which may be configured to practice all or selected aspects of methods 200 or 300. In various embodiments, memory controller 104, control block 106 and/or error correction block 108 may additionally or alternatively be implemented using hardware separate from the one or more processor(s) 504.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

Embodiments of apparatus, methods, systems, and devices are described herein for an error correction block configured to perform error correction on data read from a first portion of a memory based on a corresponding error correction code read from a second portion of the memory. In various embodiments, a control block coupled to the error correction block may be configured to selectively enable the error correction block to perform error correction on data read from the memory or disable the error correction block from performance of error correction on data read from the memory, based at least in part on a current operation mode of the memory. In various embodiments, the error correction block and the control block may be part of a memory controller, which may be coupled to one or more processors.

In various embodiments, the control block may be configured to determine whether, since a most recent transition of the memory to a first operation mode in which the memory has a first susceptibility for error from a second operation mode in which the memory has a second susceptibility for error that is greater than the first susceptibility, error correction has been performed on the data read from the first portion of the memory. In various embodiments, the control block may be configured to enable the error correction block to perform error correction on the data read from the first portion, responsive to a determination that, since the most recent transition, error correction has not been performed on data read from the first portion. In various embodiments, the control block may be configured to disable the error correction block from performance of error correction on the data read from the first portion, responsive to a determination that, since the most recent transition, error correction has been performed on data stored in the first portion.

In various embodiments, the control block may be configured to disable the error correction block at least until the memory transitions from the first operation mode back to the second operation mode. For example, in various embodiments, the second portion may be configured to store an indication of whether, since the most recent transition, error correction has been performed on data read from the first portion. In various embodiments, the control block may be configured to write or cause to write, to the second portion, the indication that, since the most recent transition from the second operation mode to the first operation mode, error correction has been performed on data read from the first portion, responsive to the performed error correction.

In various embodiments, the memory may be configured to be refreshed at a first rate while in a first operation mode and refreshed at a second rate while in a second operation mode. In various embodiments, the second rate may be lower than the first rate. In various embodiments, the memory may consume less power while in the first operation mode than in the second operation mode.

In various embodiments, the error correction block may be configured to calculate and store, in the second portion of the memory, the error correction code that corresponds to the data read from the first portion of the memory. In various embodiments, the control block may be configured to selectively enable the error correction block to calculate and store the error correction code or disable the error correction block from calculation and storage of the error correction code, based at least in part on the current operation mode of the memory.

In various embodiments, the control block may be further configured to transition the memory from the first operation mode to the second operation mode. In various embodiments, the transition from the first operation mode to the second operation mode may include determination of whether the error correction code stored in the second portion is valid for data read from the first portion. In various embodiments, the control block may be configured to enable the error correction block to perform the calculation and storage, responsive to a determination that the error correction code is invalid. In various embodiments, on transition of the memory from the second operation mode to the first operation mode, the control block may be configured to disable the error correction block from calculation and storage of the error correction code until transition of the memory from the first operation mode back to the second operation mode. In various embodiments, the control block may be configured to designate the error correction code as invalid responsive to a first write to the second portion after transition from the second operation mode to the first operation mode.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The invention claimed is:

1. An apparatus, comprising:
an error correction block configured to perform error correction on data read from a first portion of a memory based on a corresponding error correction code read from a second portion of the memory; and
a control block coupled to the error correction block and configured to selectively enable the error correction block to perform error correction on data read from the memory or disable the error correction block from performance of error correction on data read from the memory, based at least in part on a current operation mode of the memory.

2. The apparatus of claim 1, further comprising a memory controller, wherein the memory controller comprises the error correction block and the control block.

3. The apparatus of claim 2, further comprising one or more processors coupled with the memory controller.

4. The apparatus of claim 1, wherein the control block is configured to determine whether, since a most recent transition of the memory to a first operation mode in which the memory has a first susceptibility for error from a second operation mode in which the memory has a second susceptibility for error that is greater than the first susceptibility, error correction has been performed on the data read from the first portion of the memory.

5. The apparatus of claim 4, wherein the control block is configured to enable the error correction block to perform error correction on the data read from the first portion, responsive to a determination that, since the most recent transition, error correction has not been performed on data read from the first portion.

6. The apparatus of claim 4, wherein the control block is configured to disable the error correction block from performance of error correction on the data read from the first portion, responsive to a determination that, since the most recent transition, error correction has been performed on data stored in the first portion.

7. The apparatus of claim 6, wherein the control block is configured to disable the error correction block at least until the memory transitions from the first operation mode back to the second operation mode.

8. The apparatus of claim 4, wherein the second portion is configured to store an indication of whether, since the most recent transition, error correction has been performed on data read from the first portion, wherein the control block is further configured to write or cause to write, to the second portion, the indication that, since the most recent transition, error correction has been performed on data read from the first portion, responsive to the performed error correction.

9. The apparatus of claim 2, further comprising the memory, wherein the memory is configured to be refreshed at a first rate while in a first operation mode and refreshed at a second rate while in a second operation mode, and wherein the second rate is lower than the first rate.

10. The apparatus of claim 9, wherein the memory consumes less power while in the first operation mode than in the second operation mode.

11. The apparatus of claim 1, wherein the error correction block is further configured to calculate and store, in the second portion of the memory, the error correction code that corresponds to the data read from the first portion of the memory; and
the control block is further configured to selectively enable the error correction block to calculate and store the error correction code or disable the error correction block from calculation and storage of the error correction code, based at least in part on the current operation mode of the memory.

12. The apparatus of claim 11, wherein the control block is further configured to transition the memory from a first operation mode in which the memory has a first susceptibility to error to a second operation mode in which the memory has a second susceptibility to error that is greater than the first susceptibility.

13. The apparatus of claim 12, wherein the transition comprises determination of whether the error correction code stored in the second portion is valid for data read from the first portion.

14. The apparatus of claim 13, wherein the control block is further configured to enable the error correction block to perform the calculation and storage, responsive to a determination that the error correction code is invalid.

15. The apparatus of claim 12, wherein on transition of the memory from the second operation mode to the first operation mode, the control block is configured to disable the error correction block from calculation and storage of the error correction code until transition of the memory from the first operation mode back to the second operation mode.

16. The apparatus of claim 15, wherein the control block is configured to designate the error correction code as invalid responsive to a first write to the second portion after transition from the second operation mode to the first operation mode.

17. The apparatus of claim 1, wherein the memory comprises volatile memory.

18. A system comprising:
an error correction block configured to:
  perform error correction on data read from a first portion of memory based on a corresponding error correction code read from a second portion of the memory; and
  calculate and store, in the second portion of the memory, the error correction code based on the data read from the first portion of the memory,
a control block coupled to the error correction block and configured to:
  selectively enable the error correction block to perform error correction on data read from the memory or disable the error correction block from performance of error correction on data read from the memory, based at least in part on a current operation mode of memory; and
  selectively enable the error correction block to calculate and store the error correction code or disable the error correction block from calculation and storage of the error correction code, based at least in part on the current operation mode of the memory, and
a touch screen display.

19. A computer-implemented method, comprising:
determining whether, by a control block of a memory controller, since a most recent transition of memory to a first operation mode in which the memory has a first susceptibility for error from a second operation mode in which the memory has a second susceptibility for error that is greater than the first susceptibility, error correction has been performed on data read from a first portion of the memory; and
selectively performing, by an error correction block of the memory controller under control of the control block, error correction on data read from a first portion of a memory based on a corresponding error correction code read from a second portion of the memory, based on the determination.

20. The computer-implemented method of claim 19, further comprising performing, by the error correction block under control of the control block, error correction on the data read from the first portion, responsive to a determination that, since the most recent transition, error correction has not been performed on data read from the first portion.

21. The computer-implemented method of claim 19, further comprising refraining, by the error correction block under control of the control block, from performance of error correction on the data read from the first portion, responsive to a determination that, since the most recent transition, error correction has been performed on data stored in the first portion.

22. The computer-implemented method of claim 21, wherein the refraining comprises refraining from performance of the error correction at least until the memory transitions from the first operation mode back to the second operation mode.

23. The computer-implemented method of claim 19, wherein the second portion is configured to store an indication of whether, since the most recent transition, error correction has been performed on data read from the first portion, the method further comprising writing or causing to write, to the second portion, the indication that, since the most recent transition, error correction has been performed on data read from the first portion, responsive to the performed error correction.

* * * * *